United States Patent
Kwasinski et al.

(10) Patent No.: US 9,641,090 B2
(45) Date of Patent: May 2, 2017

(54) MULTIPLE-INPUT SOFT-SWITCHING POWER CONVERTERS

(71) Applicant: Board of Regents, The University of Texas System, Austin, TX (US)

(72) Inventors: Alexis Kwasinski, Austin, TX (US); Sheng-Yang Yu, Austin, TX (US); Ruichen Zhao, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 741 days.

(21) Appl. No.: 13/931,616

(22) Filed: Jun. 28, 2013

(65) Prior Publication Data
US 2014/0001858 A1    Jan. 2, 2014

Related U.S. Application Data

(60) Provisional application No. 61/665,999, filed on Jun. 29, 2012.

(51) Int. Cl.
*H02J 1/10* (2006.01)
*H02J 3/38* (2006.01)
(Continued)

(52) U.S. Cl.
CPC .... *H02M 3/33569* (2013.01); *H05B 33/0815* (2013.01); *H05B 37/02* (2013.01);
(Continued)

(58) Field of Classification Search
CPC ............ G06F 1/28; G06F 1/26; H02M 3/335; H02M 1/12; H02M 3/1584; H02J 1/10;
(Continued)

(56) References Cited

U.S. PATENT DOCUMENTS 6,147,882 A * 11/2000 Huber .................... H02M 1/10
                                                                    363/143
6,356,462 B1    3/2002 Jang et al.
(Continued)

OTHER PUBLICATIONS

Ruan et al., "Isolated Multiple-Input DC/DC Converter Using Alternative Pulsating Source as Building Cells," 2010 International Power Electronics Conference, pp. 1463-1470, Jun. 21-24, 2010.
(Continued)

*Primary Examiner* — Fritz M Fleming
*Assistant Examiner* — Jagdeep Dhillon
(74) *Attorney, Agent, or Firm* — Robert A. Voigt, Jr.; Winstead, P.C.

(57) ABSTRACT

A multiple-input power converter transferring energy from multiple input sources to a load comprises a plurality of voltage inputs. The power converter implements soft-switching techniques thereby reducing the converter switching losses and increasing the converter efficiency while using fewer components than presently designed multiple-input power converters. Such a power converter may include multiple input sources, where serially connected switches are coupled to one of the multiple input sources in an input leg. A voltage blocking capacitor is inserted between these input legs. Furthermore, the power converter includes a transformer for isolating the load from the multiple input sources, where the voltage blocking capacitor is connected to the primary winding of the transformer.

15 Claims, 13 Drawing Sheets

(51) Int. Cl.

| | | |
|---|---|---|
| *H02M 3/335* | (2006.01) | |
| *H05B 33/08* | (2006.01) | |
| *H05B 37/02* | (2006.01) | |
| *H02M 1/10* | (2006.01) | |
| *H02J 7/00* | (2006.01) | |
| *H02J 9/06* | (2006.01) | |

(52) U.S. Cl.
CPC .............. *H02J 1/10* (2013.01); *H02J 7/0013* (2013.01); *H02J 9/062* (2013.01); *H02M 1/10* (2013.01); *H02M 3/335* (2013.01); *Y02B 70/1433* (2013.01); *Y10T 307/549* (2015.04)

(58) Field of Classification Search
CPC ...... H02J 1/12; H02J 1/00; H02J 1/102; H02J 3/14; H03K 3/00
USPC ............ 307/52, 82, 17, 42, 83, 50; 700/291, 700/292; 363/39, 17, 20, 61; 327/109, 327/110
See application file for complete search history.

(56) References Cited

U.S. PATENT DOCUMENTS

| | | | | |
|---|---|---|---|---|
| 6,466,458 | B2 | 10/2002 | Zhang et al. | |
| 7,227,277 | B2 | 6/2007 | Chapman et al. | |
| 7,869,237 | B1* | 1/2011 | Schutten | H02M 3/33507 363/132 |
| 9,000,617 | B2* | 4/2015 | Gazit | H02J 1/10 307/17 |
| 2001/0036088 | A1* | 11/2001 | Wittenbreder, Jr. | H02M 3/33576 363/17 |
| 2007/0024254 | A1* | 2/2007 | Radecker | H02M 7/537 323/247 |
| 2010/0198421 | A1* | 8/2010 | Fahimi | H02J 3/32 700/291 |
| 2011/0090717 | A1* | 4/2011 | Lee | H02M 3/33584 363/21.02 |
| 2011/0095606 | A1* | 4/2011 | Ou | H02J 3/383 307/26 |
| 2012/0153995 | A1* | 6/2012 | Oughton, Jr. | H03K 17/00 327/109 |
| 2013/0062958 | A1* | 3/2013 | Erickson, Jr. | H02M 3/1582 307/82 |
| 2013/0127358 | A1* | 5/2013 | Yao | H05B 33/0815 315/201 |

OTHER PUBLICATIONS

Dobbs et al., "A Multiple-Input DC-DC Converter Topology," Power Eelectronics Letters, IEEE, vol. 1, No. 1, pp. 6-9, Mar. 2003.
Yu et al., "A Multiple-Input Current-Source Converter for a Stand-Alone Hybrid Power System," Applied Power Electronics Conference and Exposition (APEC), 2011 Twenty-Sixth Annual IEEE, pp. 35-40, Mar. 6-11, 2011.
Ahmed et al., "Design of a Linearly Increasing Inrush Current Limit Circuit for DC-DC Boost Regulators," 2010 IEEE Asia Pacific Conference on Circuits and Systems, Dec. 6-9, 2010.
Liu et al., "A Systematic Approach to Synthesizing Multi-Input DC-DC Converters," IEEE Transactions on Power Electronics, vol. 24, No. 1, pp. 116-127, Jan. 2009.
Michon et al., "A Three-Port Bi-Directional Converter for Hybrid Fuel Cell Systems," 35th Annual IEEE Power Electronics Specialists Conference, 2004, vol. 6, pp. 4736-4742, Jun. 20-25, 2004.
Yuan et al., "Analysis and Design of a High Efficiency Current Fed Multi-Resonant Converter for High Step-Up Power Conversion in Renewable Energy Harvesting," 2010 2nd IEEE International Symposium on Power Electronics for Distributed Generation Systems (PEDG), pp. 138-143, Jun. 16-18, 2010.
Rodriguez et al., "Analysis and Modeling of a Two-Input DC/DC Converter with Two Controlled Variables and Four Switched Networks," Energy Conversion Engineering Conference, Proceedings of the 31st Intersociety, vol. 1, pp. 322-327, Aug. 11-16, 1996.
Al-Atrash et al., "Boost-Integrated Phase-Shift Full-Bridge Converter for Three-Port Interface," Power Electronics Specialists Conference, pp. 2313-2321, Jun. 17-21, 2007.
Sabate et al., "Design Considerations for High-Voltage High-Power Full-Bridge Zero-Voltage-Switched PWM Converter," Applied Power Electronics Conference and Exposition, Fifth Annual, pp. 275-284, Mar. 11-16, 1990.
Tao et al., "Family of Multiport Bidirectional DC-DC Converters," IEEE Proceedings—Electric Power Applications, vol. 153, No. 3, pp. 451-458, May 1, 2006.
Alexis Kwasinski, "Identification of Feasible Topologies for Multiple-Input DC-DC Converters," IEEE Transactions on Power Electronics, vol. 24, No. 3, pp. 856-861, Mar. 2009.
Yu et al., "Multiple-Input Soft-Switching Converters in Renewable Energy Applications," 2012 IEEE Conversion Congress and Exposition, Sep. 2012.

* cited by examiner

MULTIPLE-INPUT SOFT-SWITCHING POWER CONVERTERS

CROSS-REFERENCE TO RELATED APPLICATIONS

This application is related to the following commonly owned co-pending U.S. patent application:

Provisional Application Ser. No. 61/665,999, "Multiple Input Soft-Switching Power Converters," filed Jun. 29, 2012, and claims the benefit of its earlier filing date under 35 U.S.C. §119(e).

TECHNICAL FIELD

The present invention relates generally to electrical power conversion, and more particularly to multiple-input power converters implementing soft-switching techniques thereby reducing the converter switching losses and increasing the converter efficiency while using fewer components than presently designed multiple-input power converters.

BACKGROUND

Most electrical systems are supplied by one kind of energy source, e.g., batteries, wind energy, solar energy, or utility energy. Certain special cases are supplied by two sources, such as uninterruptible power supplies. Electrical systems would beneficially be supplied by energy sources of all kinds. Renewable sources are of particular interest, as resources are further distributed about the terrestrial power grid. In islanded power systems, interfacing of multiple sources allows for improved reliability, flexibility, and use of preferred energy sources. The different sources, such as photovoltaic cells, fuel cells, and batteries, generally have different voltage and current characteristics. In some cases, one source is preferential to others; in other cases, a simultaneous combination of sources is appropriate for energy or resource use. Typically, each different source requires a different power converter. As a result, a single-input power converter may be utilized for converting the energy of a particular power source. However, a system with multiple single-input power converters can become complex with a large number of energy sources. As a result, multiple-input power converters may be used to convert energy from multiple energy sources. By integrating all the energy sources through a single conversion device, the structure is simplified resulting in a low cost, unified control and compact system.

Multiple-input power converters can be divided into the following categories: time-sharing multiple-input power converters, multiple-input power converters with pulsating current source cells; multiple-input power converters with pulsating voltage source cells; multiple-input power converters with alternative pulsating current source cells; multiple-input power converters with alternative pulsating voltage source cells; multiple-winding magnetic coupled multiple-input power converters; and multiple-input direct-connected push-pull power converters. Unfortunately, energy conversion using such multiple-input power converters either involves the utilization of a significant number of components or limited voltage conversion ratios which result in significant switching losses, a reduction in converter efficiency, and a limit in the scope of multiple-input power converter applications.

BRIEF SUMMARY

In one embodiment of the present invention, a multiple-input power converter transferring energy from multiple input sources to a load comprises a plurality of voltage inputs. The power converter further comprises a first plurality of serially connected switches coupled to a first voltage input of the plurality of voltage inputs in a first input leg. The power converter additionally comprises a second plurality of serially connected switches coupled to a second voltage input of the plurality of voltage inputs in a second input leg. Furthermore, the power converter comprises a first capacitor inserted between the first input leg and the second input leg. Additionally, the power converter comprises a load. In addition, the power converter comprises a transformer isolating the load from the plurality of voltage inputs, where the first capacitor is coupled to a primary winding of the transformer.

In another embodiment of the present invention, a multiple-input power converter transferring energy from multiple input sources to a load comprises a plurality of voltage inputs. The power converter further comprises a first inductor coupled to a first voltage input of the plurality of voltage inputs in a first input leg. The power converter additionally comprises a second inductor coupled to a second voltage input of the plurality of voltage inputs in a second input leg. Furthermore, the power converter comprises a first capacitor inserted between the first input leg and the second input leg. Additionally, the power converter comprises a load. In addition, the power converter comprises a transformer isolating the load from the plurality of voltage inputs, where the capacitor is coupled to a primary winding of the transformer.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

As stated in the Background section, multiple-input power converters can be divided into the following categories: time-sharing multiple-input power converters, multiple-input power converters with pulsating current source cells; multiple-input power converters with pulsating voltage source cells; multiple-input power converters with alternative pulsating current source cells; multiple-input power converters with alternative pulsating voltage source cells; multiple-winding magnetic coupled multiple-input power converters; and multiple-input direct-connected push-pull power converters. Unfortunately, energy conversion using such multiple-input power converters either involves the utilization of a significant number of components or limited voltage conversion ratios which result in significant switching losses, a reduction in converter efficiency, and a limit in the scope of multiple-input power converter applications.

The principles of the present invention provide a means for implementing soft-switching techniques thereby reducing the converter switching losses and increasing the converter efficiency while using fewer components than presently designed multiple-input power converters as discussed below in connection with FIGS. 1, 2A-2F and 3-16.

Figure 1:
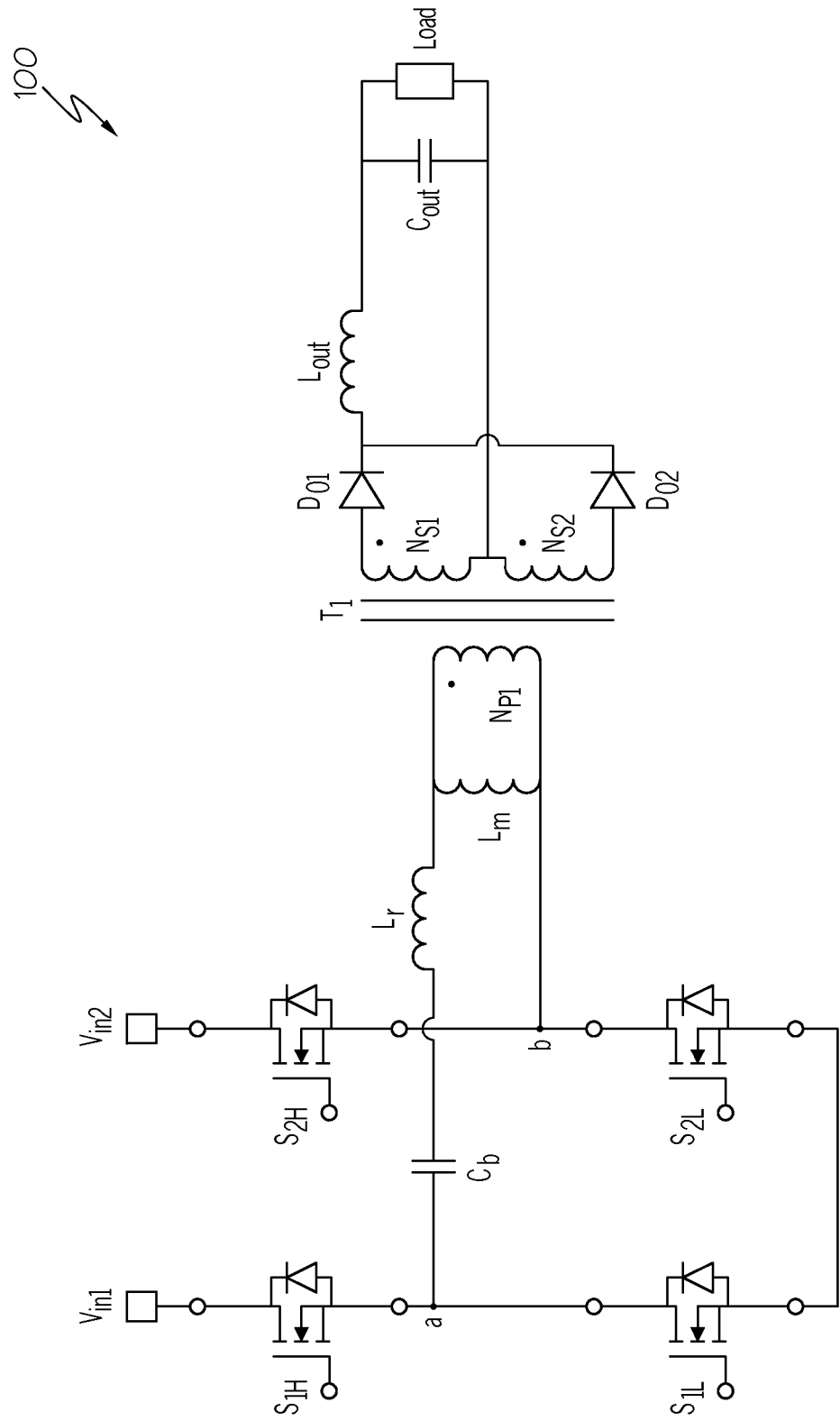
FIG. 1 illustrates a first type of a dual-input phase-shift full-bridge power converter in accordance with an embodiment of the present invention.
Figure 3:
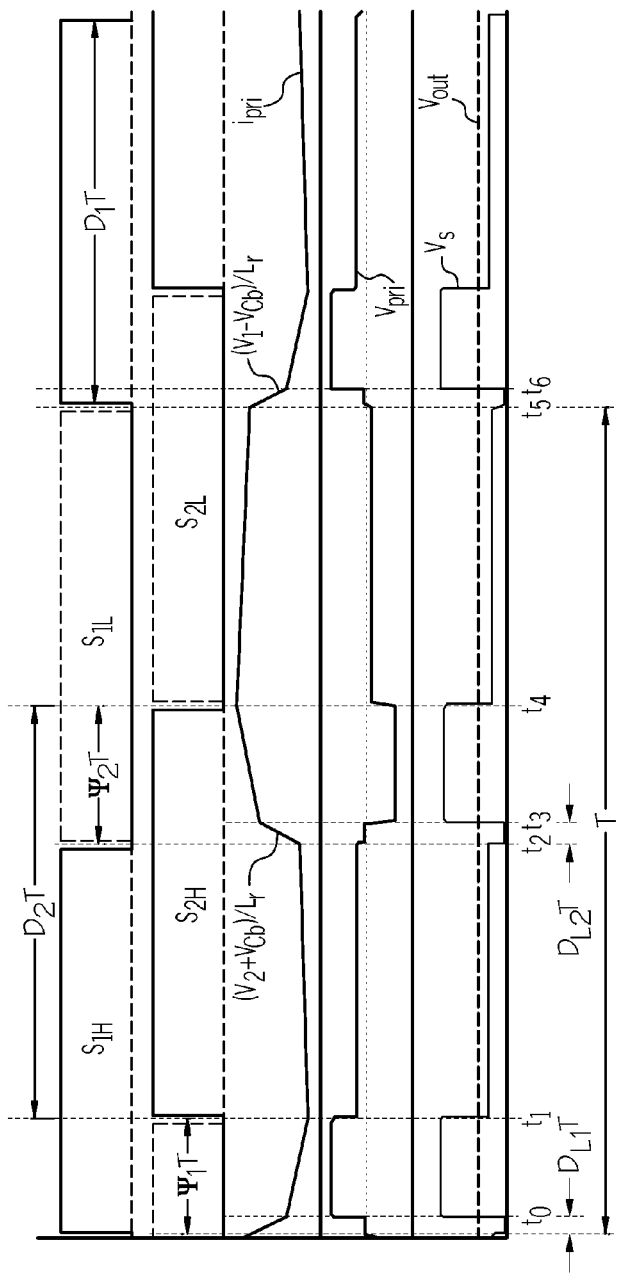
FIG. 3 illustrates the key waveforms during the six states of the first type of the dual-input phase-shift full-bridge power converter in accordance with an embodiment of the present invention.
Figure 4:
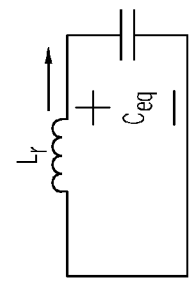
FIG. 4 illustrates the equivalent resonant circuit during the dead time of the first type of the dual-input phase-shift full-bridge power converter in accordance with an embodiment of the present invention.
Figure 5:
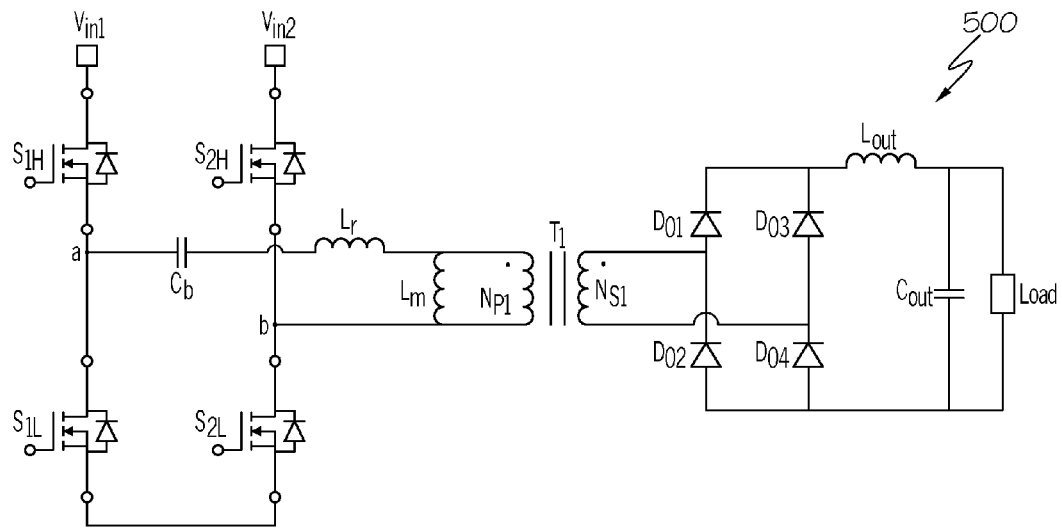
FIG. 5 illustrates a second type of a dual-input phase-shift full-bridge power converter in accordance with an embodiment of the present invention.
Figure 6:
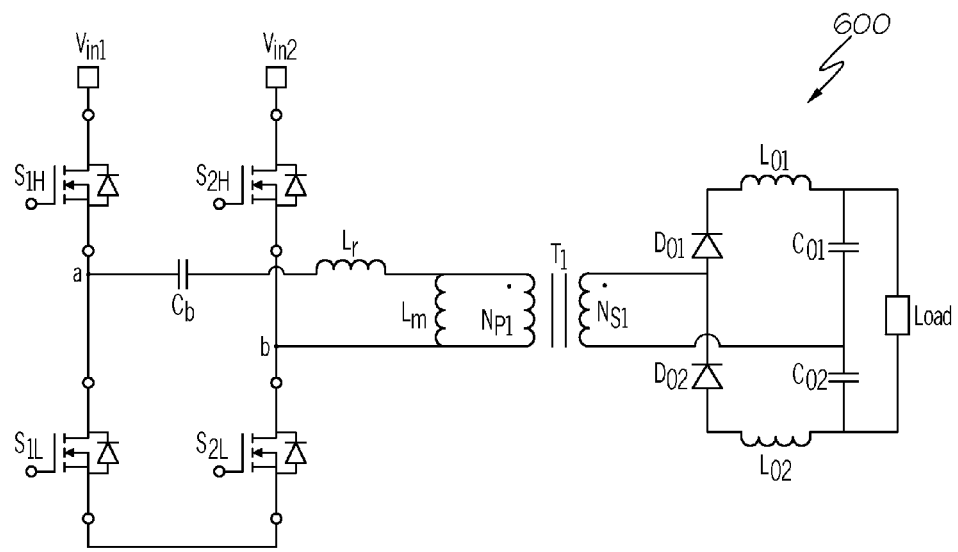
FIG. 6 illustrates a third type of a dual-input phase-shift full-bridge power converter in accordance with an embodiment of the present invention.
Figure 7:
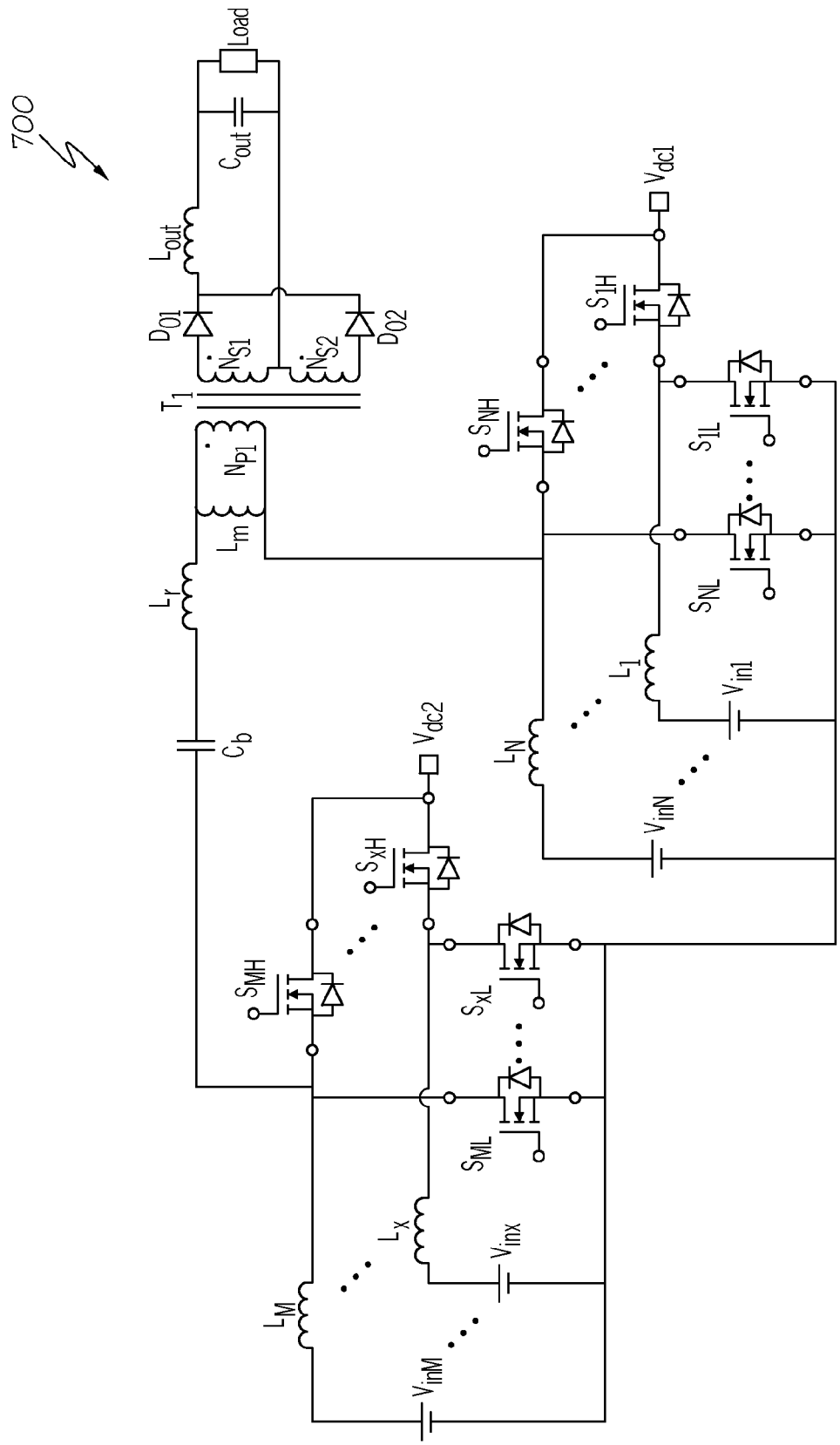
FIG. 7 illustrates a first type of a multiple-input phase-shift full-bridge power converter in accordance with an embodiment of the present invention.
Figure 8:
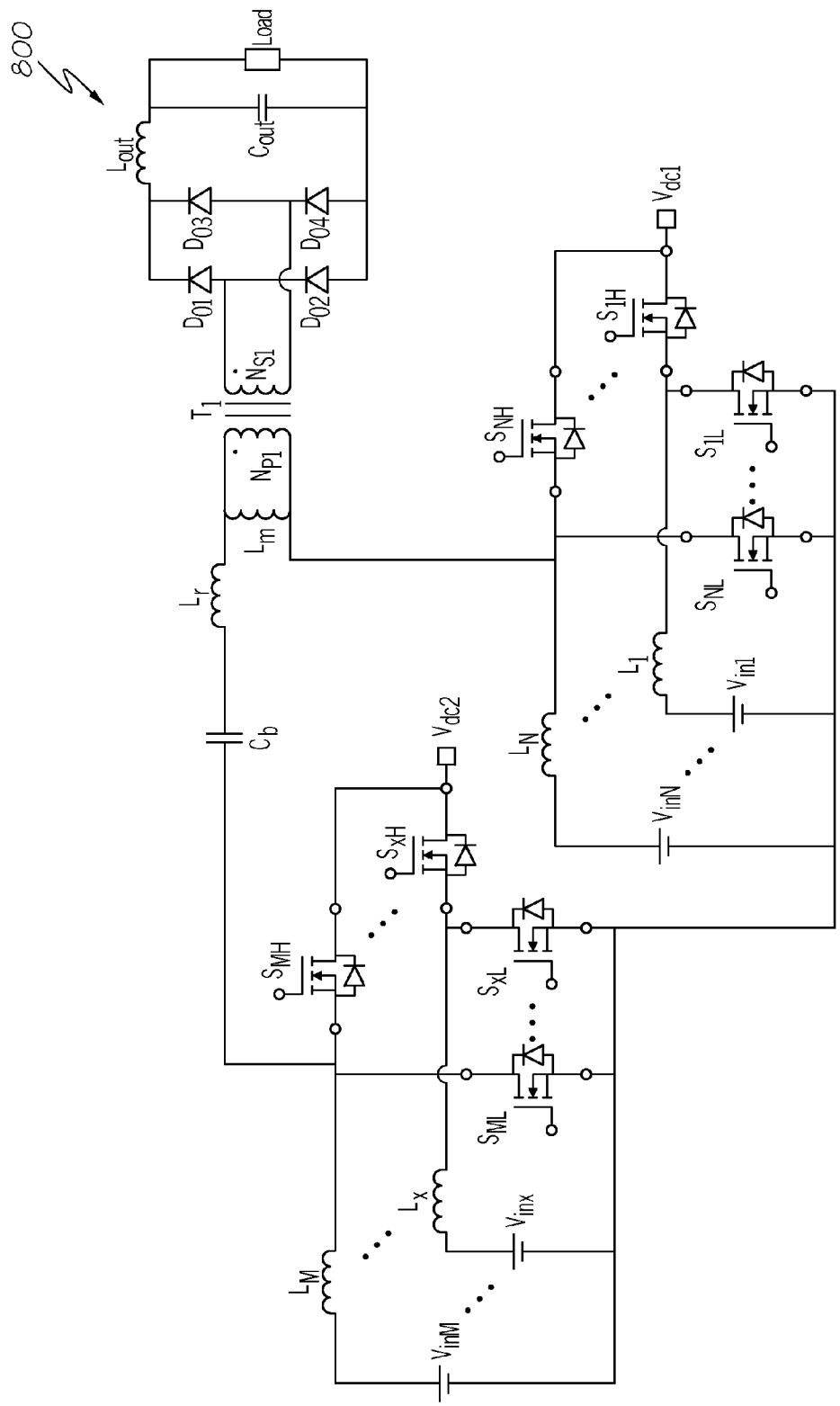
FIG. 8 illustrates a second type of a multiple-input phase-shift full-bridge power converter in accordance with an embodiment of the present invention.
Figure 9:
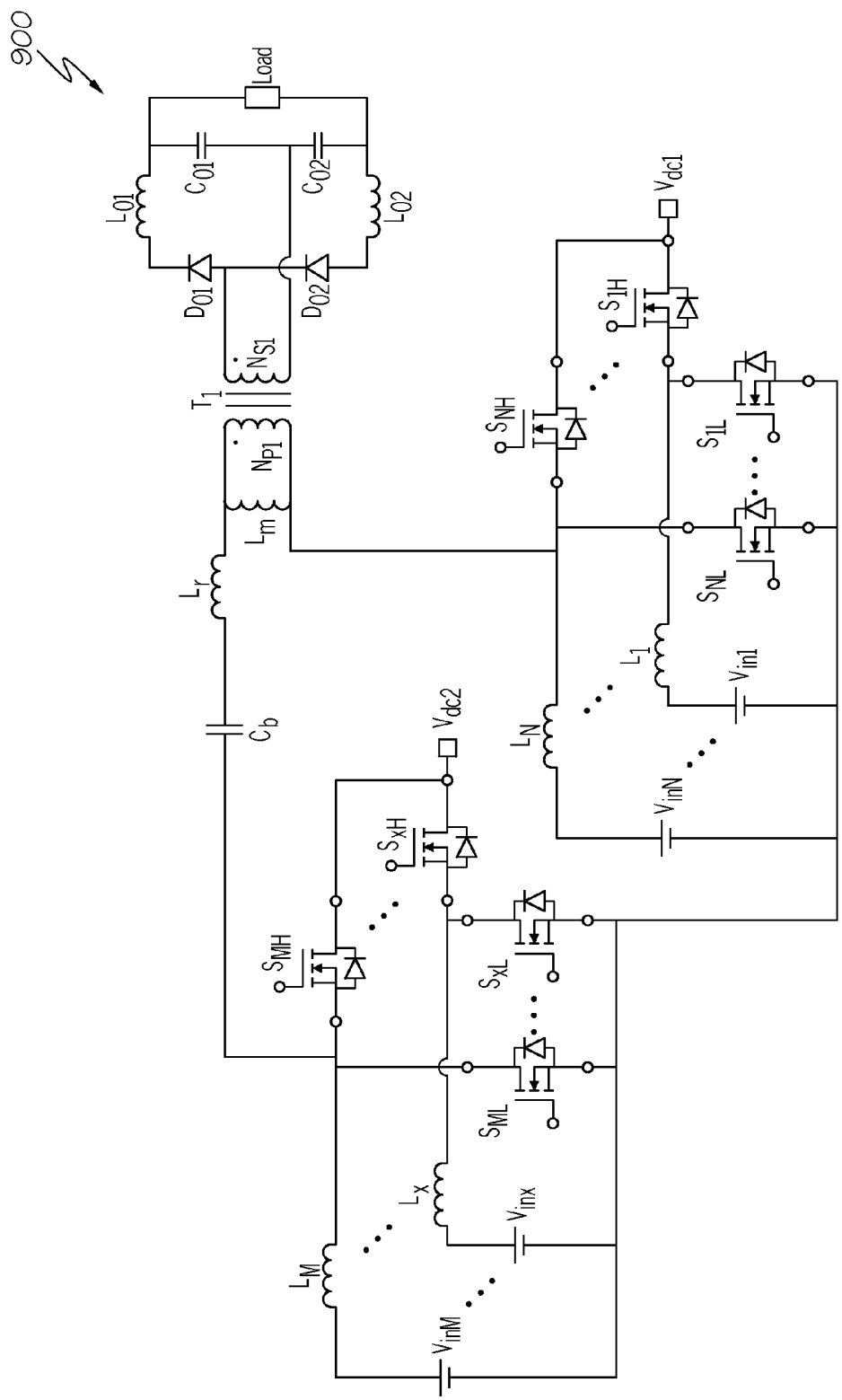
FIG. 9 illustrates a third type of a multiple-input phase-shift full-bridge power converter in accordance with an embodiment of the present invention.
Figure 10:
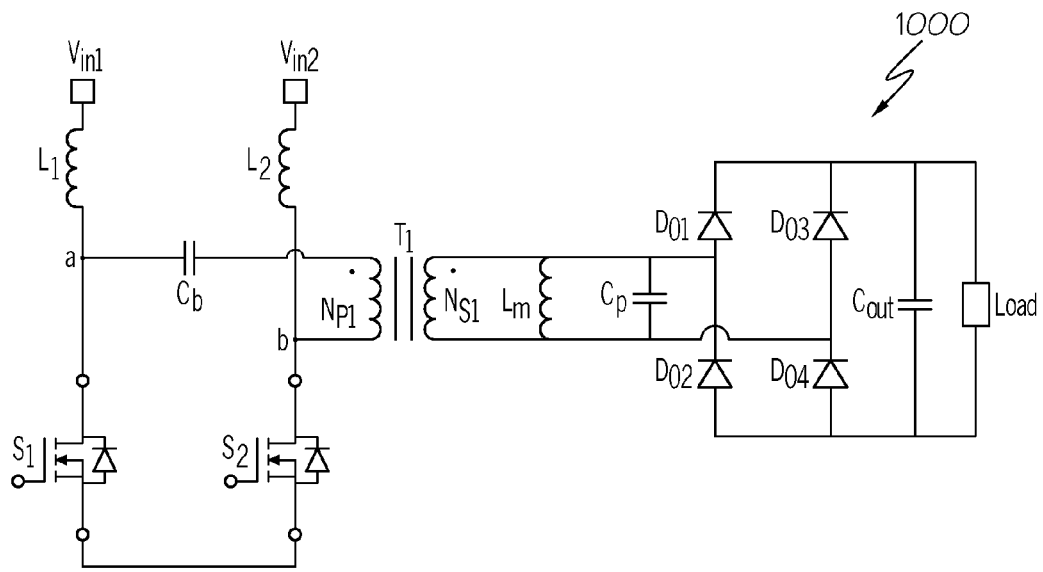
FIG. 10 illustrates a first type of a dual-input parallel resonant power converter in accordance with an embodiment of the present invention.
Figure 11:
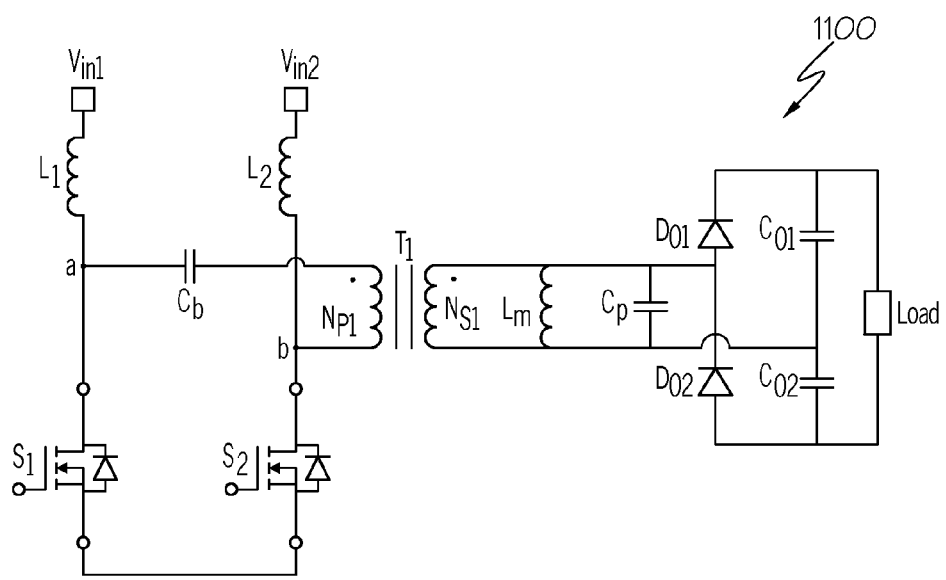
FIG. 11 illustrates a second type of a dual-input parallel resonant power converter in accordance with an embodiment of the present invention.
Figure 12:
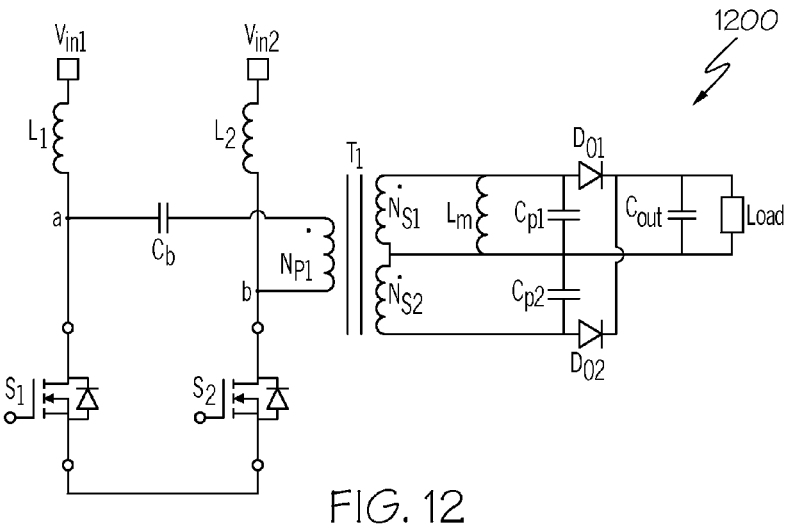
FIG. 12 illustrates a third type of a dual-input parallel resonant power converter type in accordance with an embodiment of the present invention.
Figure 14:
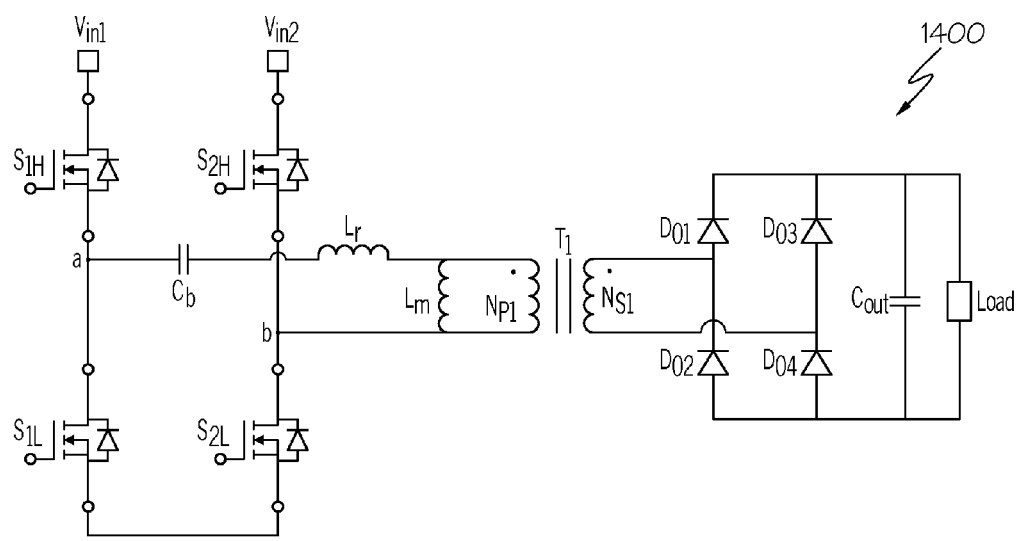
FIG. 14 illustrates a first type of a dual-input series resonant power converter in accordance with an embodiment of the present invention.
Figure 13:
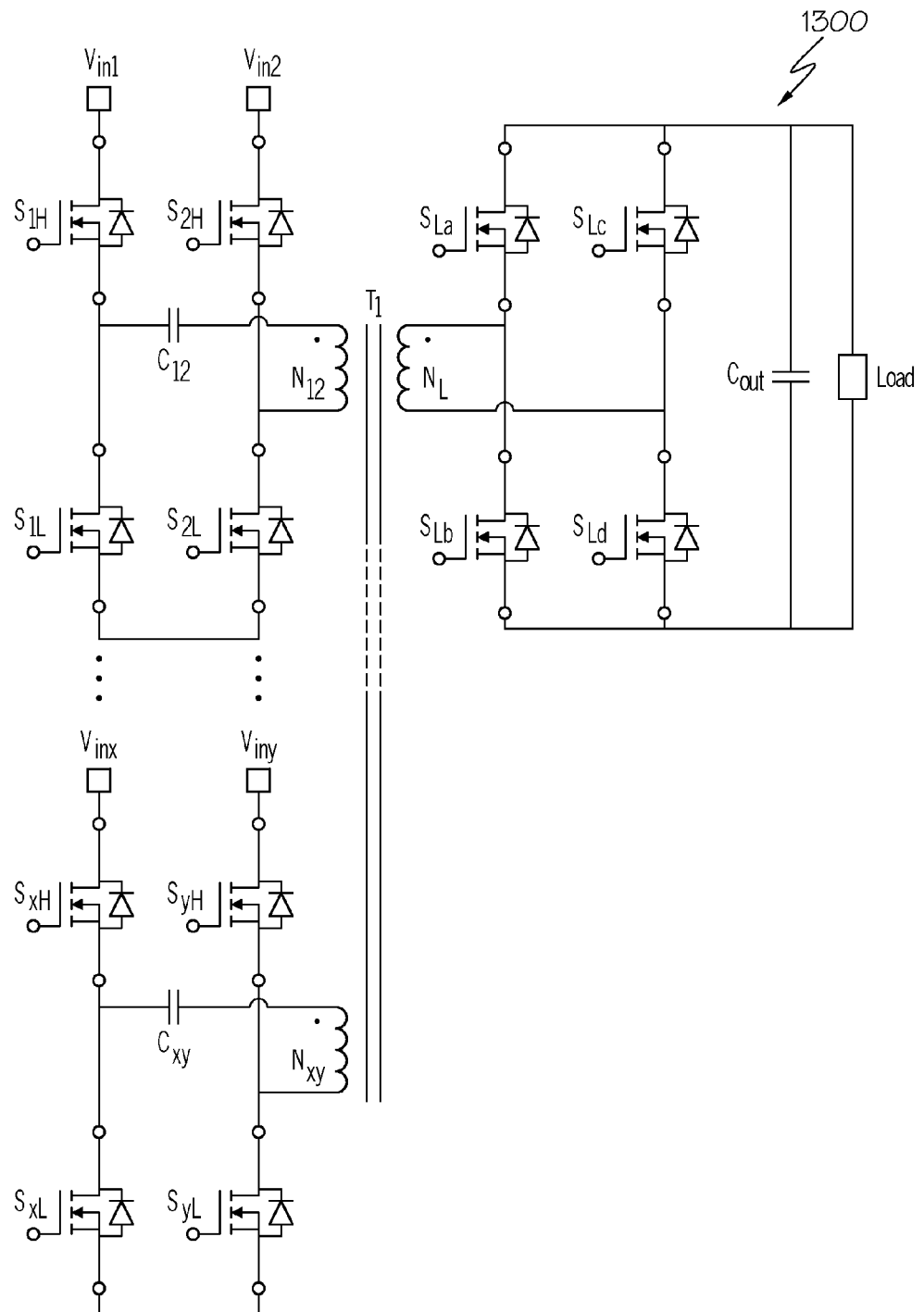
FIG. 13 illustrates a multiple-winding magnetic coupled multiple-input phase-shift full-bridge power converter in accordance with an embodiment of the present invention.
Figure 15:
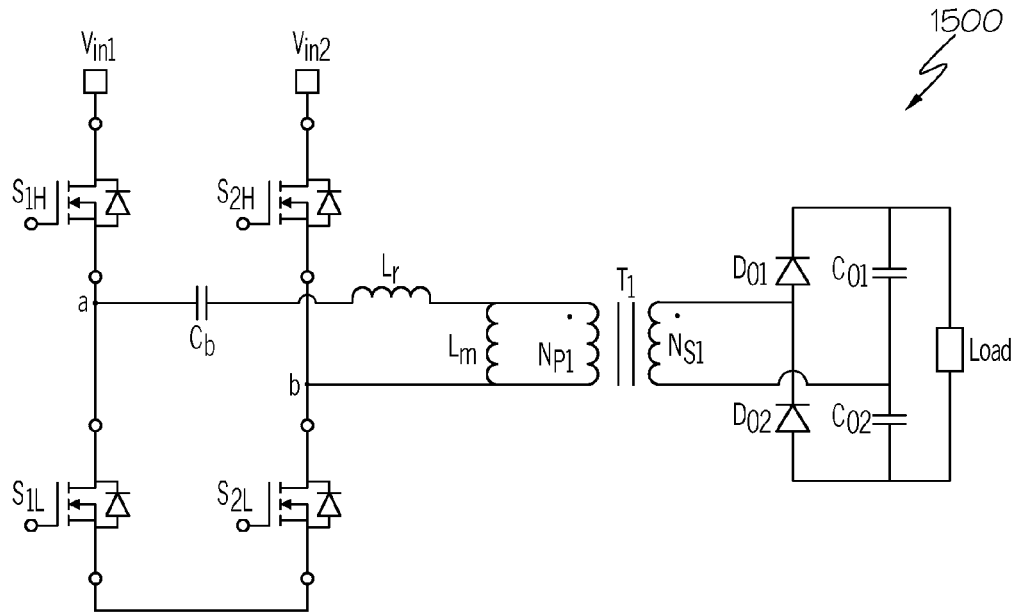
FIG. 15 illustrates a second type of a dual-input series resonant power converter in accordance with an embodiment of the present invention.
Figure 16:
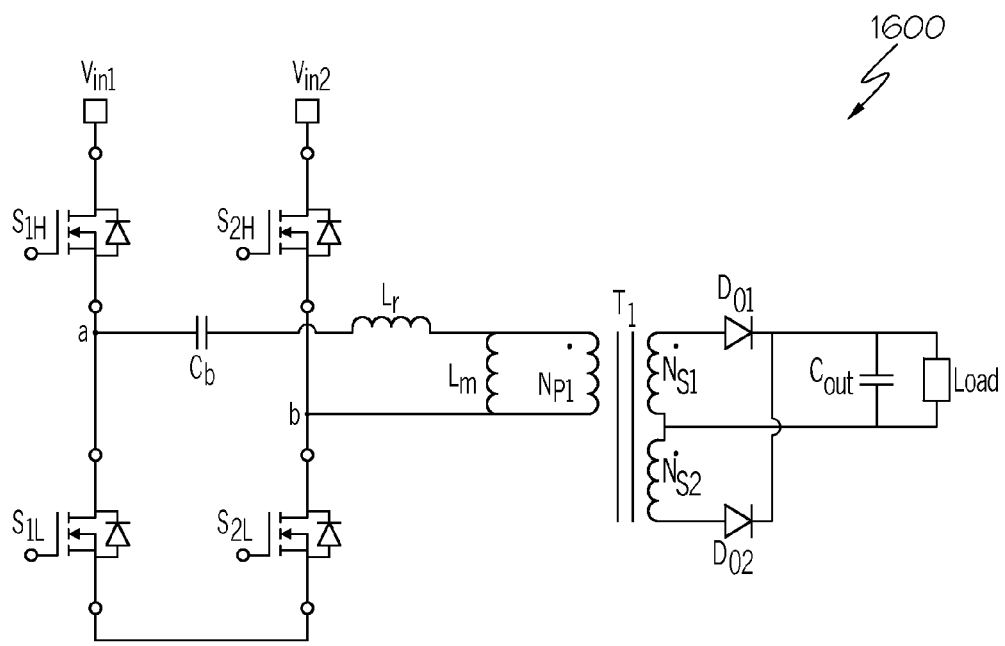
FIG. 16 illustrates a third type of a dual-input series resonant power converter in accordance with an embodiment of the present invention.

FIG. 1 illustrates a first type of a dual-input phase-shift full-bridge power converter. FIGS. 2A-2F illustrate the six states for the continuous current mode operations of the first type of the dual-input phase-shift full-bridge power converter. FIG. 3 illustrates the key waveforms during the six states of the first type of the dual-input phase-shift full-bridge power converter. FIG. 4 illustrates the equivalent resonant circuit during the dead time of the first type of the dual-input phase-shift full-bridge power converter. FIG. 5 illustrates a second type of a dual-input phase-shift full-bridge power converter. FIG. 6 illustrates a third type of a dual-input phase-shift full-bridge power converter. FIG. 7 illustrates a first type of a multiple-input phase-shift full-bridge power converter. FIG. 8 illustrates a second type of a multiple-input phase-shift full-bridge power converter. FIG. 9 illustrates a third type of a multiple-input phase-shift full-bridge power converter. FIG. 10 illustrates a first type of a dual-input parallel resonant power converter. FIG. 11 illustrates a second type of a dual-input parallel resonant power converter. FIG. 12 illustrates a third type of a dual-input parallel resonant power converter type. FIG. 13 illustrates a multiple-winding magnetic coupled multiple-input phase-shift full-bridge power converter. FIG. 14 illustrates a first type of a dual-input series resonant power converter. FIG. 15 illustrates a second type of a dual-input series resonant power converter. FIG. 16 illustrates a third type of a dual-input series resonant power converter.

As stated above, FIG. 1 illustrates a first type of a dual-input phase-shift full-bridge power converter 100 in accordance with an embodiment of the present invention.

Referring to FIG. 1, converter 100 includes a Direct Current ("DC") voltage blocking capacitor $C_b$ inserted between the input legs (legs of inputs $V_{in1}$ and $V_{in2}$). With this blocking capacity $C_b$, the duty cycle of the input switches on each leg are not necessary symmetric in order to maintain the voltage balance of the magnetizing inductor $L_m$. Each input voltage ($V_{in1}$ and $V_{in2}$) is connected to a high level switch ($S_{1H}$ and $S_{2H}$, respectively) and a low level switch ($S_{1L}$ and $S_{2L}$, respectively) where node "a" is connected to blocking capacity $C_b$ which is serially connected to leakage inductor $L_r$, which is coupled in series to the parallel connected magnetizing inductor $L_m$ and primary winding $N_{P1}$ of the transformer $T_1$. Switches $S_{1H}$ and $S_{1L}$ are connected serially. Similarly, switches $S_{2H}$ and $S_{2L}$ are connected serially. Furthermore, a terminal end of magnetizing inductor $L_m$ is connected to node "b." In one embodiment, the transformer magnetizing inductor $L_m$ is much greater than the leakage inductor $L_r$ at the corresponding winding. In one embodiment, the DC voltage blocking capacitor $C_b$ is much greater than the capacitance of MOSFET parasitic capacitors $C_p$.

Converter 100 further includes a load (identified as "Load" in FIG. 1) coupled in parallel to the output capacitor $C_{out}$, which is in series to the output inductor $L_{out}$. The inductor $L_{out}$ is connected in series to diodes $D_{O1}$ and $D_{O2}$ which are coupled to the secondary windings $N_{S1}$ and $N_{S2}$, respectively, of transformer $T_1$.

A pulsating voltage is applied to the corresponding input transformer or coupled-inductor winding of an isolated converter. In general, the pulsating voltage can be generated either by a single pulsating voltage or by two different pulsating voltages as shown in FIG. 1. The voltage at the transformer input winding of converter 100 is the differential voltage of the two pulsating voltages. In an input cell of converter 100, a DC voltage source is connected to the two switching legs to generate a pulsating voltage on the transformer input winding. However, additional control factors other than the phase differences are required for input cells to ensure the energy flows are all controllable, for example, a variable duty cycle. Yet, a variable duty cycle might cause a voltage unbalance on the magnetizing inductance of transformer $T_1$. To avoid the possible voltage unbalance, DC voltage blocking capacitor $C_b$ is inserted in series with the two pulsating voltages and transformer $T_1$.

Furthermore, transformer $T_1$ isolates the load from the sources thereby increasing the safety of converter 100 and providing a wider range of source-to-load voltage transfer ratios. The characteristic can be examined through the topology operational analysis. For example, the continuous current mode (CCM) operations of the first type of a dual-input phase-shift full-bridge power converter 100 can be divided into six states, shown in FIGS. 2A-2F, respectively, for deriving its sources-to-load voltage transfer ratio in accordance with an embodiment of the present invention.

Figure 2A:
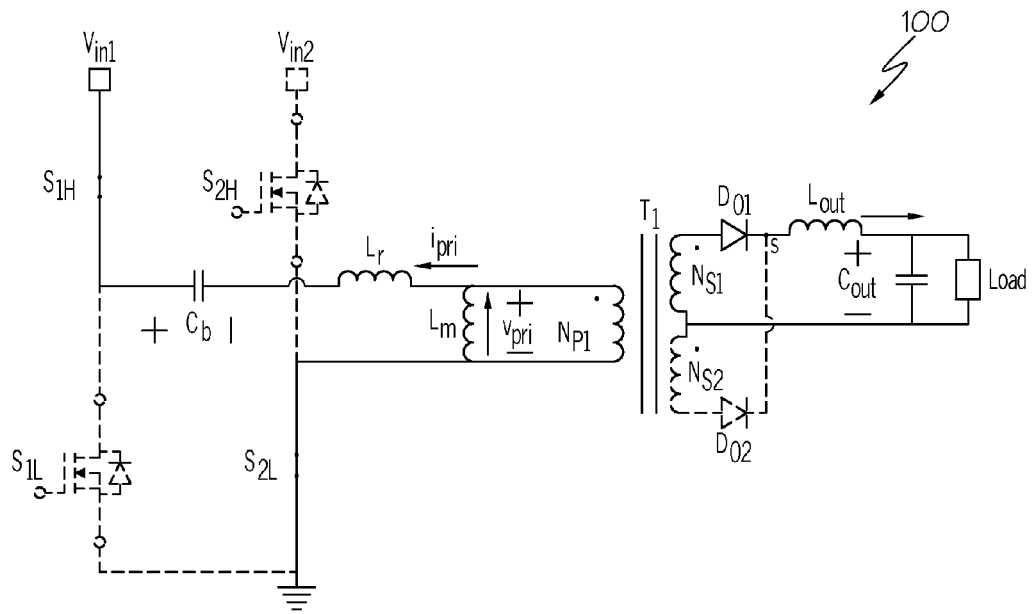
FIGS. 2A-2F illustrate the six states for the continuous current mode operations of the first type of the dual-input phase-shift full-bridge power converter in accordance with an embodiment of the present invention.

Referring to FIGS. 2A-2F, the operational analysis of converter 100 is performed under the condition of $V_{in1}>V_{in2}$. Under such a condition, there are the following six different states:

State 1 ($t_0<t<t_1$) shown in FIG. 2A: In this state, input inductors, $L_m$ and $L_r$, are energized by $V_{in1}$, hence, $V_{pri}$ has a positive voltage. Therefore, the input energy is transferred from transformer winding $N_{P1}$ to winding $N_{S1}$ and then through $D_{O1}$ to $L_{out}$, $C_{out}$ and the load.

Figure 2B:
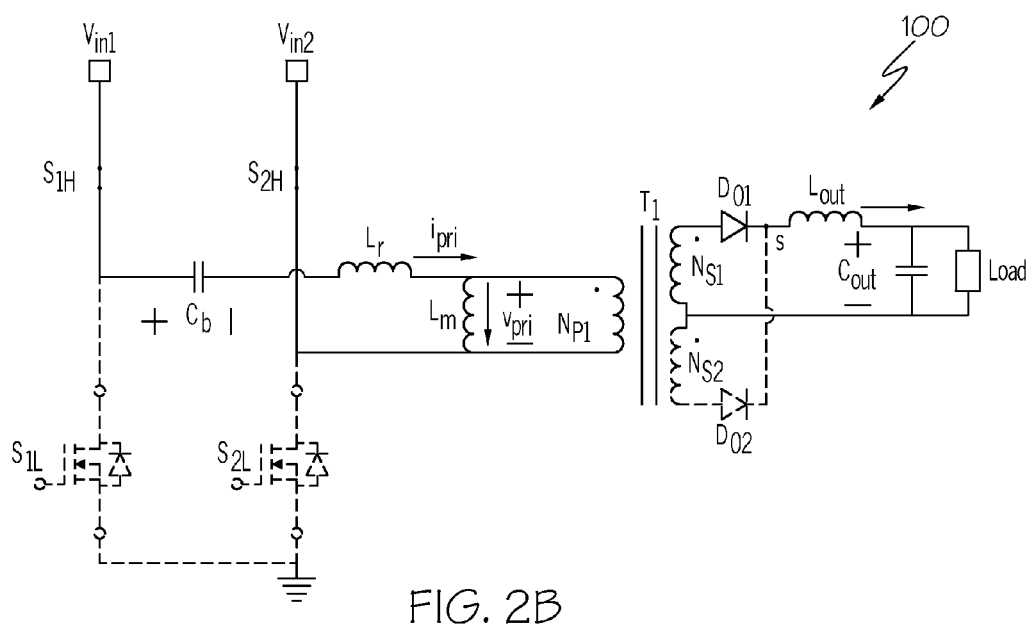

State 2 ($t_1<t<t_2$) shown in FIG. 2B: In this state, both $S_{1H}$ and $S_{2H}$ are turned on in this state, therefore, $i_{Lr}$ flows through both input sources, which implies that in this state the energy in one input source is transferred to the load and the other input source.

Figure 2C:
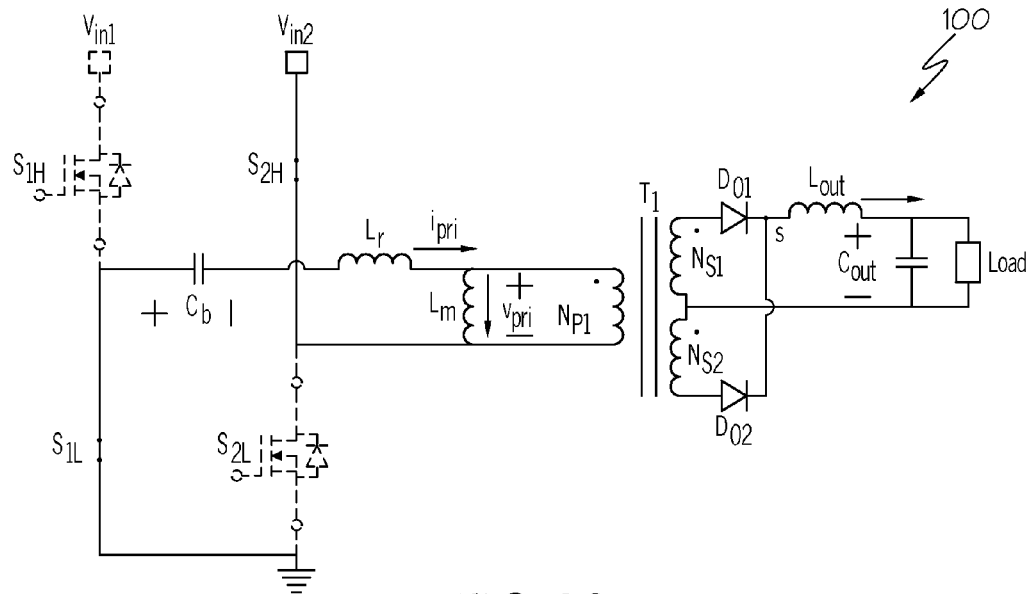

State 3 ($t_2<t<t_3$) shown in FIG. 2C: In this state, $S_{2H}$ and $S_{1L}$ are turned on and the voltage polarity of the input inductors becomes negative, which means that the leakage inductor current $i_{Lr}$ decreases in this state and would eventually reverse its direction. However, the inductance, $L_r$, limits the changing rate of $i_{Lr}$. Thus, $L_r$ sustains all the voltage $V_{in2}+V_{Cb}$, whereas, $V_{pri}$ is zero in this state. That is, the input energy in this state does not transfer to the load side. Hence, a duty cycle loss ($D_{L1}$) may be defined as ($t_3-t_2$)/T, where T is a period of time. In the meantime, the output diode current $i_{DO1}$ decreases and the output diode current $i_{DO2}$ increases.

Figure 2D:
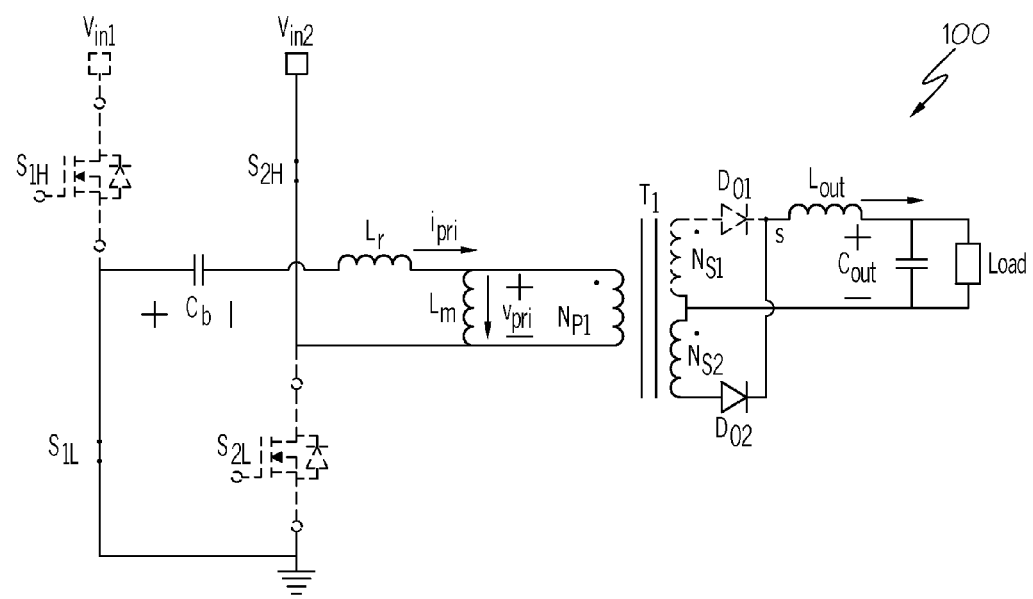

State 4 ($t_3<t<t_4$) shown in FIG. 2D: State 4 begins when $i_{DO1}$ decreases to zero and $V_{pri}$ becomes negative. In State 4, energy starts to be transferred from the inputs side to the output side through transformer winding $N_{P1}$ to $N_{S2}$ and then to $D_{O2}$.

Figure 2E:
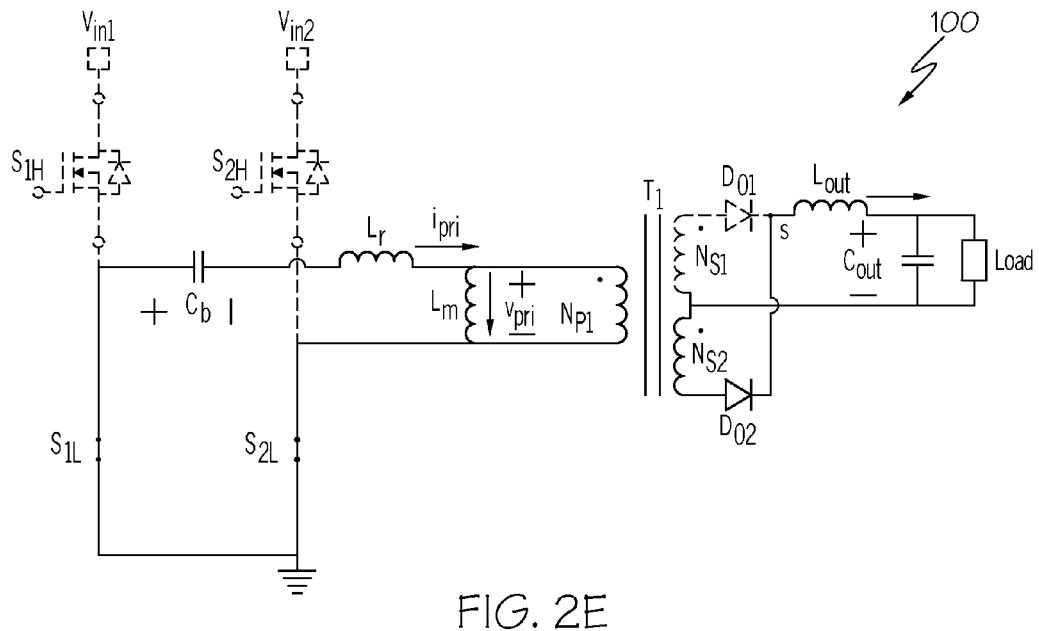

State 5 ($t_4<t<t_5$) shown in FIG. 2E: In this state, no source is applied to the input energy storage components and the energy stored in $C_b$ is continuously discharged.

Figure 2F:
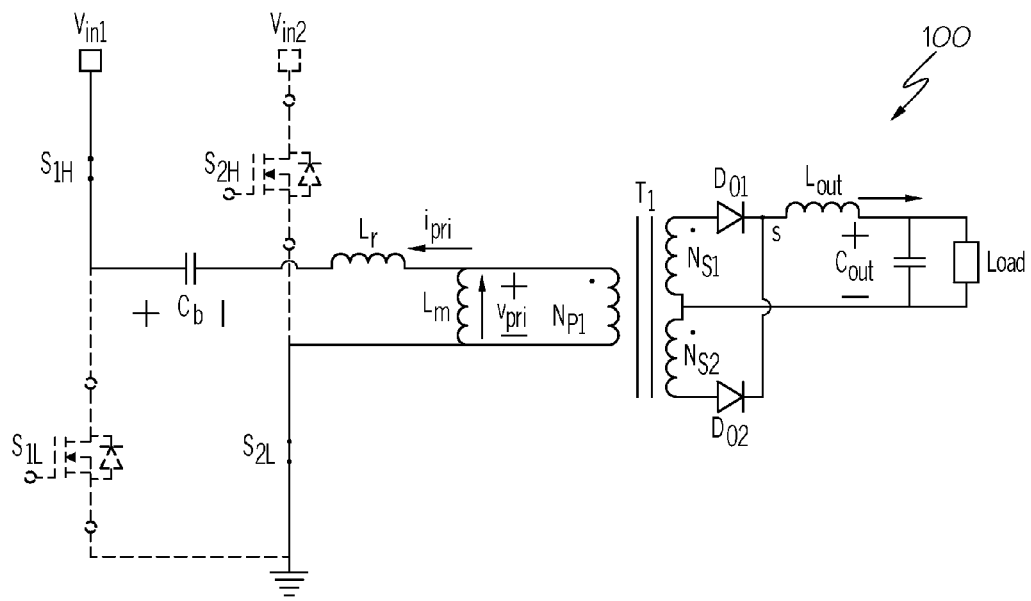

State 6 ($t_5<t<t_6$) shown in FIG. 2F: In this state, a loop from $V_{in1}$, $C_b$ and transformer $T_1$ to ground is formed. Similar to state 3, an opposite polarity is applied to the input inductors voltage and $V_{pri}$ is zero. A duty cycle loss ($D_{L2}$) may be defined as ($t_6-t_5$)/T, where T is a period of time.

The dynamic equations of the capacitors remain the same in the six states:

$$C_b \frac{dv_{Cb}}{dt} = i_{Lr} \quad \text{(EQ 1)}$$

$$C_{out} \frac{dv_{Cout}}{dt} = i_{Lout} - \frac{v_{Cout}}{R} \quad \text{(EQ 2)}$$

It is noted that the average current of input winding, $i_{pri}$, is zero in states 3 and 6, which means that the energy at the input side does not transfer to the output side in these states.

The related key waveforms for deriving the sources-to-load voltage transfer ratio (shown in FIGS. 2A-2F) are shown in FIG. 3 in accordance with an embodiment of the present invention with $V_{in1}>V_{in2}$, where $D_{L1}$ and $D_{L2}$ are duty cycle losses caused by the leakage inductor $L_r$ and $V_s$ is the voltage at point "s" referring to the middle point of the center tapped transformer winding. Notice that state i is the time interval between $t_{i-1}$ to $t_i$ for i=1, 2, . . . , 6. The sources-to-loads voltage transfer ratio can be represented as (EQ 3):

$$V_{out} = \frac{(\phi_1 - D_{L1})(V_{in1} - V_{Cb}) + (D_1 - \phi_1)|V_{in1} - V_{in2} - V_{Cb}| + (\phi_2 - D_{L2})(V_{in2} + V_{Cb}) + (D_2 - \phi_1)|V_{Cb}|}{n}$$

where $\phi_2=\phi_1+D_2-D_1$, $n=N_{P1}:(N_{S1}=N_{S2})$, and $V_{Cb}=D_1 V_{in1}-D_2 V_{in2}$. The duty cycle losses can be represented as (EQ 4):

$$D_{L1} = \frac{I_{Lout,min}L_r}{n(V_{in1}-V_{Cb})T},$$

$$D_{L2} = \frac{I_{Lout,min}L_r}{n(V_{in2}+V_{Cb})T}$$

Moreover, in the topologies of the present invention (FIGS. 1 and 5-16), it is possible to implement soft-switching techniques, which can reduce the converter switching losses and increase the converter efficiency. During the dead times intervals (both switches are turned off in one input leg) of converter 100, a first order LC circuit is formed, shown in FIG. 4 in accordance with an embodiment of the present invention.

Referring to FIG. 4, the first order LC circuit includes a leakage inductor $L_r$ in series with an equivalent resonant capacitor $C_{eq}$.

When the following condition is satisfied, soft-switching can be achieved on input switches (EQ 5):

$$L_r i_{Lr}^2(0) \geq C_{eq} v_{Ceq}^2(0)$$

where $C_{eq}$ equals to $2C_{oss}$ ($C_{oss}$ is the parasitic capacitance of input switches); $v_{Ceq}(0)$ equals the input voltage, and $i_{Lr}(0)$ and $v_{Ceq}(0)$ are the initial conditions of $L_r$ and $C_{eq}$, respectively. Soft-switching can mitigate some of the mechanisms of switching losses (e.g., losses due to high voltage and high current present in the switch during transitions and losses due to shorting device capacitances) and possibly reduce the generation of EMI. In implementing soft-switching, semiconductor devices are switched on or off at the zero crossing of their voltage or current waveforms thereby eliminating the switching loss caused by IGBT (Insulated-Gate Bipolar Transistor) current tailing and by stray inductances as well as eliminating the switching loss induced by diode stored charge and device output capacitances.

In addition, the topologies of the present invention (FIGS. 1 and 5-16) have lower component numbers when compared to the multiple-input converters that are currently used. In other words, the cost of implementing the topologies of the present invention is less than the cost of implementing the multiple-input converters that are currently used.

Other multiple-input converters implementing the principles of the present invention are discussed below in connection with FIGS. 5-16. Each of the multiple-input soft-switching power converters of FIGS. 5-16 isolates the loads from the sources via a transformer thereby increasing the safety of the system and providing wider ranges of source-to-load voltage transfer ratios as well as implements soft-switching techniques in a manner that reduces the converter switching losses and number of components and increases the converter efficiency. It is noted that previously discussed components will be labeled with the same element numbers in these Figures and will not be reiterated for the sake of brevity.

A second type of a dual-input phase-shift full-bridge power converter 500 implementing the principles of the present invention is shown in FIG. 5 in accordance with an embodiment of the present invention.

Referring to FIG. 5, in comparison to converter 100 of FIG. 1, converter 500 additionally includes serially connected diodes $D_{O3}$ and $D_{O4}$ which are coupled in parallel to serially connected diodes $D_{O1}$ and $D_{O2}$. The anode of diode $D_{O1}$ and the cathode of diode $D_{O4}$ are connected to the secondary winding ($N_{S1}$) of transformer $T_1$.

A third type of a dual-input phase-shift full-bridge power converter 600 implementing the principles of the present invention is shown in FIG. 6 in accordance with an embodiment of the present invention.

Referring to FIG. 6, in comparison to converter 100 of FIG. 1, converter 600 includes two serially connected output capacitors, $C_{O1}$ and $C_{O2}$, which are in parallel to serially connected output diodes $D_{O1}$ and $D_{O2}$. Converter 600 further includes output inductor $L_{O1}$ in series with output capacitor $C_{O1}$ and output diode $D_{O1}$. Furthermore, converter 600 includes output inductor $L_{O2}$ in series with output capacitor $C_{O2}$ and output diode $D_{O2}$. The anode of diode $D_{O1}$ and a terminal of output capacitor $C_{O2}$ are connected to the secondary winding ($N_{S1}$) of transformer $T_1$.

A first type of a multiple-input phase-shift full-bridge power converter 700 implementing the principles of the present invention is shown in FIG. 7 in accordance with an embodiment of the present invention.

Referring to FIG. 7, in comparison to converter 100 of FIG. 1, converter 700 includes multiple levels of input voltages, inductors and switches coupled to the output voltage $V_{dc1}$. For example, input voltages ($V_{in1} \ldots V_{inN}$) are coupled in series to inductors $L_1 \ldots L_N$, which are coupled in series to switches $S_{1H} \ldots S_{NH}$, where N is a positive integer number. Furthermore, each of the switches $S_{1H} \ldots S_{NH}$ is coupled in parallel to switches $S_{1L} \ldots S_{NL}$. Similarly, multiple levels of input voltages, inductors and switches are coupled to the output voltage $V_{dc2}$. For example, input voltages ($V_{inx} \ldots V_{inM}$) are coupled in series to inductors $L_x \ldots L_M$, which are coupled in series to switches $S_{xH} \ldots S_{MH}$, where M is a positive integer number. Furthermore, each of the switches $S_{xH} \ldots S_{MH}$ is coupled in parallel to switches $S_{xL} \ldots S_{ML}$. The terminal of blocking capacity $C_b$ is coupled to inductor $L_M$ and switch $S_{MH}$.

A second type of a multiple-input phase-shift full-bridge power converter 800 implementing the principles of the present invention is shown in FIG. 8 in accordance with an embodiment of the present invention.

Referring to FIG. 8, in comparison to converter 700 of FIG. 7, converter 800 includes the circuitry of converter 500 of FIG. 5 coupled to the secondary windings $N_{S1}$ of transformer $T_1$.

A third type of a multiple-input phase-shift full-bridge power converter 900 implementing the principles of the present invention is shown in FIG. 9 in accordance with an embodiment of the present invention.

Referring to FIG. 9, in comparison to converter 700 of FIG. 7, converter 900 includes the circuitry of converter 600 of FIG. 6 coupled to the secondary windings $N_{S1}$ of transformer $T_1$.

A first type of a dual-input parallel resonant power converter 1000 implementing the principles of the present invention is shown in FIG. 10 in accordance with an embodiment of the present invention.

Referring to FIG. 10, in comparison to converter 500 of FIG. 5, converter 1000 includes inductors $L_1$ and $L_2$ which replace switches $S_{1H}$ and $S_{2H}$. Furthermore, blocking capacity $C_b$ is directly connected to the primary windings $N_{P1}$ of transformer $T_1$. Additionally, the secondary windings $N_{S1}$ of transformer $T_1$ are connected to inductor $L_m$ and capacitor $C_p$ in parallel.

A second type of a dual-input parallel resonant power converter 1100 implementing the principles of the present invention is shown in FIG. 11 in accordance with an embodiment of the present invention.

Referring to FIG. 11, in comparison to converter 1000 of FIG. 10, converter 1100 includes a set of serially connected output capacitors, $C_{O1}$ and $C_{O2}$, and a set of serially connected diodes, $D_{O1}$ and $D_{O2}$, where each of these sets of capacitors and diodes is connected in parallel to the load. The anode of diode $D_{O1}$ and the terminal of capacitor $C_{O2}$ are connected to the secondary windings $N_{S1}$ of transformer $T_1$.

A third type of a dual-input parallel resonant power converter 1200 implementing the principles of the present invention is shown in FIG. 12 in accordance with an embodiment of the present invention.

Referring to FIG. 12, in comparison to converter 1000 of FIG. 10, converter 1200 includes a diode $D_{O1}$ connected in parallel to the load and capacitor $C_{out}$. Diode $D_{O1}$ is in series with capacitor $C_{p1}$ which is serially connected to capacitor $C_{p2}$ which is in series with diode $D_{O2}$ which is in series with diode $D_{O1}$. Furthermore, converter 1200 includes an inductor $L_m$ located in parallel to capacitor $C_{p1}$. Inductor $L_m$ and capacitor $C_{p1}$ are connected across secondary windings $N_{S1}$ of transformer $T_1$ and capacitor $C_{p2}$ is connected across secondary windings $N_{S2}$ of transformer $T_1$.

A multiple-winding magnetic coupled multiple-input phase-shift full-bridge power converter 1300 implementing the principles of the present invention is shown in FIG. 13 in accordance with an embodiment of the present invention.

Referring to FIG. 13, converter 1300 includes multiple levels of input voltages, blocking capacitors and switches coupled to the primary wirings of transformer T1. For example, input voltages, $V_{in1} \ldots Vi_{nx}$, $V_{in2} \ldots V_{iny}$, are coupled in series to switches $S_{1H} \ldots S_{xH}$, $S_{2H} \ldots S_{yH}$, respectively, which are connected in series to switches $S_{1L} \ldots S_{xL}$, $S_{2L} \ldots S_{yL}$, respectively, where x and y are positive integer numbers. Furthermore, each level includes a blocking capacitor $C_{12} \ldots C_{xy}$ coupled to the terminal of switches $S_{1H} \ldots S_{xH}$, respectively, and to the primary windings $N_{12} \ldots N_{xy}$ of transformer $T_1$. Additionally, converter 1300 includes an output capacitor, $C_{out}$, coupled in parallel to the load which is coupled in parallel to serially connected switches, $S_{La}$, $S_{Lb}$ and $S_{Lc}$, $S_{Ld}$. The terminals of switches $S_{La}$ and $S_{Ld}$ are connected to the secondary windings $N_L$ of transformer $T_1$.

A first type of a dual-input series resonant power converter 1400 implementing the principles of the present invention is shown in FIG. 14 in accordance with an embodiment of the present invention.

Referring to FIG. 14, in comparison to converter 500 of FIG. 5, converter 1400 does not include inductor $L_{out}$.

A second type of a dual-input series resonant power converter 1500 implementing the principles of the present invention is shown in FIG. 15 in accordance with an embodiment of the present invention.

Referring to FIG. 15, in comparison to converter 600 of FIG. 6, converter 1500 does not include inductors $L_{o1}$ and $L_{o2}$.

A third type of a dual-input series resonant power converter 1600 implementing the principles of the present invention is shown in FIG. 16 in accordance with an embodiment of the present invention.

Referring to FIG. 16, in comparison to converter 100 of FIG. 1, converter 1600 does not include inductor $L_{out}$.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A multiple-input power converter transferring energy from multiple input sources to a load, the multiple-input power converter comprising:
   a plurality of voltage inputs;
   a first plurality of serially connected switches coupled to a first voltage input of said plurality of voltage inputs in a first input leg;
   a second plurality of serially connected switches coupled to a second voltage input of said plurality of voltage inputs in a second input leg;
   a first capacitor inserted between said first input leg and said second input leg;
   a load;
   a transformer isolating said load from said plurality of voltage inputs, wherein said first capacitor is coupled to a primary winding of said transformer;
   a second capacitor connected in parallel to said load;
   a third plurality of serially connected switches connected in parallel to said load; and
   a fourth plurality of serially connected switches connected in parallel to said load;
   wherein a terminal of a first switch of said third plurality of serially connected switches is connected to a secondary winding of said transformer, wherein a terminal of a first switch of said fourth plurality of serially connected switches is connected to said secondary winding of said transformer.

2. A multiple-input power converter transferring energy from multiple input sources to a load, the multiple-input power converter comprising:
   a plurality of voltage inputs;
   a first plurality of serially connected switches coupled to a first voltage input of said plurality of voltage inputs in a first input leg;
   a second plurality of serially connected switches coupled to a second voltage input of said plurality of voltage inputs in a second input leg;
   a first capacitor inserted between said first input leg and said second input leg;
   a load;
   a transformer isolating said load from said plurality of voltage inputs, wherein said first capacitor is coupled to a primary winding of said transformer;
   a leakage inductor coupled in series to said first capacitor, wherein said leakage inductor is connected to said primary winding of said transformer; and
   a magnetizing inductor coupled in series with said leakage inductor.

3. The multiple-input power converter as recited in claim 2, wherein said first capacitor is configured to maintain a voltage balance of said magnetizing inductor in response to a duty cycle of said first and second plurality of serially connected switches not being symmetric.

4. The multiple-input power converter as recited in claim 2 further comprising:
   a first and a second diode connected to a first and a second secondary windings of said transformer, respectively; and
   a second capacitor in parallel with said load and said first and second diodes.

5. The multiple-input power converter as recited in claim 4 further comprising:
   a first inductor serially connected to said first diode and to said second capacitor in parallel with said load.

6. The multiple-input power converter as recited in claim 2 further comprising:
   a first and a second diode serially connected; and
   a third and a fourth diode serially connected;
   wherein said first and second diodes are in parallel to said load, wherein said third and fourth diodes are in parallel with said load and in parallel with said first and second diodes.

7. The multiple-input power converter as recited in claim 6 further comprising:
   a second capacitor in parallel with said load.

8. The multiple-input power converter as recited in claim 7 further comprising:
   a first inductor in series with said second capacitor.

9. A multiple-input power converter transferring energy from multiple input sources to a load, the multiple-input power converter comprising:
   a plurality of voltage inputs;
   a first plurality of serially connected switches coupled to a first voltage input of said plurality of voltage inputs in a first input leg;
   a second plurality of serially connected switches coupled to a second voltage input of said plurality of voltage inputs in a second input leg;
   a first capacitor inserted between said first input leg and said second input leg;
   a load;
   a transformer isolating said load from said plurality of voltage inputs, wherein said first capacitor is coupled to a primary winding of said transformer;
   a second and a third capacitor serially connected; and
   a first and a second diode serially connected;
   wherein said second and third capacitors are in parallel with said load, wherein said first and second diodes are in parallel with said load, wherein a cathode of said first diode is connected to a secondary winding of said transformer, wherein a terminal of said third capacitor is connected to said secondary winding of said transformer.

10. The multiple-input power converter as recited in claim 9 further comprising:
   a first inductor connected in series with said second capacitor and said first diode; and
   a second inductor connected in series with said third capacitor and said second diode.

11. A multiple-input power converter transferring energy from multiple input sources to a load, the multiple-input power converter comprising:
   a plurality of voltage inputs;
   a first inductor coupled to a first voltage input of said plurality of voltage inputs in a first input leg;
   a second inductor coupled to a second voltage input of said plurality of voltage inputs in a second input leg;
   a first capacitor inserted between said first input leg and said second input leg;
   a load; and
   a transformer isolating said load from said plurality of voltage inputs, wherein said capacitor is coupled to a primary winding of said transformer.

12. The multiple-input power converter as recited in claim 11 further comprising:
   a first switch serially connected to said first inductor; and
   a second switch serially connected to said second inductor;
   wherein a terminal of said first capacitor is connected to a terminal of said first inductor.

13. The multiple-input power converter as recited in claim 11 further comprising:
   a second and a third capacitor serially connected; and
   a first and a second diode serially connected;
   wherein said second and third capacitors are in parallel with said load, wherein said first and second diodes are in parallel with said load, wherein a cathode of said first diode is connected to a secondary winding of said transformer, wherein a terminal of said third capacitor is connected to said secondary winding of said transformer.

14. The multiple-input power converter as recited in claim 13 further comprising:
   a magnetizing inductor coupled in parallel to a fourth capacitor, wherein said magnetizing inductor and said fourth capacitor are connected across said secondary winding of said transformer.

15. The multiple-input power converter as recited in claim 11 further comprising:
   a second capacitor in parallel with said load;
   a third and a fourth capacitor serially connected, wherein said third and fourth capacitors are in parallel with said second capacitor;
   a first diode connected in parallel with said second capacitor and said load and connected in series with said third capacitor; and
   a second diode in series with said fourth capacitor;
   wherein a cathode of said first diode is connected to a first secondary winding of said transformer, wherein a cathode of said second diode is connected to a second secondary winding of said transformer.

* * * * *